US008543142B2

(12) United States Patent
Yun et al.

(10) Patent No.: US 8,543,142 B2
(45) Date of Patent: Sep. 24, 2013

(54) APPARATUS AND METHOD FOR TRANSMITTING MESSAGE IN A MOBILE COMMUNICATION SYSTEM

(75) Inventors: Il-Kwon Yun, Yongin-si (KR); Hyun-Gu Lee, Hwaseong-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1060 days.

(21) Appl. No.: 12/212,095

(22) Filed: Sep. 17, 2008

(65) Prior Publication Data

US 2009/0075682 A1    Mar. 19, 2009

(30) Foreign Application Priority Data

Sep. 18, 2007    (KR) .............................. 2007-0094512

(51) Int. Cl.
*H04W 4/00*    (2009.01)

(52) U.S. Cl.
USPC ........ 455/466; 455/456.1; 370/394; 370/469; 370/389; 370/330; 370/474

(58) Field of Classification Search
USPC .............. 455/466, 456.1; 370/394, 469, 389, 370/330, 474, 395

See application file for complete search history.

(56) References Cited

U.S. PATENT DOCUMENTS

| | | | | |
|---|---|---|---|---|
| 5,917,828 | A * | 6/1999 | Thompson | 370/474 |
| 6,272,117 | B1 * | 8/2001 | Choi et al. | 370/330 |
| 6,389,016 | B1 * | 5/2002 | Sabaa et al. | 370/389 |
| 7,542,472 | B1 * | 6/2009 | Gerendai et al. | 370/394 |
| 2005/0008020 | A1 * | 1/2005 | Ashwood-Smith et al. | 370/395.1 |
| 2008/0095189 | A1 * | 4/2008 | Frazier et al. | 370/469 |
| 2008/0259926 | A1 * | 10/2008 | Tavares et al. | 370/394 |

* cited by examiner

*Primary Examiner* — David Q Nugyen
(74) *Attorney, Agent, or Firm* — Cha & Reiter, LLC (57) ABSTRACT

An apparatus and a method for addressing inefficiency of radio resources in processing response messages of a multi-message transmitted are provided. The apparatus includes a controller for transmitting consecutive message data to a message server and controlling the sending of a message to the message server indicating reception of response messages after receiving the response messages in reply to the transmitted message data.

9 Claims, 7 Drawing Sheets

APPARATUS AND METHOD FOR TRANSMITTING MESSAGE IN A MOBILE COMMUNICATION SYSTEM

CLAIM OF PRIORITY

This application claims the benefit of the earlier filing date, under 35 U.S.C. §119(a), to that Korean patent application filed in the Korean Intellectual Property Office on Sep. 18, 2007 and assigned Serial No. 2007-94512, the entire disclosure of which is hereby incorporated by reference.

BACKGROUND OF THE INVENTION

1. Field of the Invention

The present invention relates to mobile communication. More particularly, the present invention relates to an apparatus and a method for addressing inefficiency of radio resources in processing response messages of a transmitted multi-message.

2. Description of the Related Art

In accordance with the rapid development of portable terminals, portable terminals enabling wireless voice communication and information exchange are requisite in life. At the early stage of the portable terminal, people merely considered the portable terminal providing wireless communications with mobility. With the advances of technologies of the portable terminal and adaptation of the wireless Internet, the portable terminal realizes not only the telephone service or other functions such as schedule management, but also various has applications in areas such as a game, a remote control using short-range communications, and an image capture using an embedded digital camera.

Of the various functions of the portable terminal, the short message function is widely used by users because of its lower cost than voice telephony.

Beyond the simple text message, a Multimedia Message Service (MMS) delivers a message including video, images, music file, and so on. The MMS is a representative wired/wireless integrated service with advantages of the short message service and the e-mail service, and is frequently used by portable terminal users within and outside the country.

In recent years, a multiple SMS or a concatenated SMS based on the transmission length is prevalently used as well as the simple text message transmission.

Figure 1:
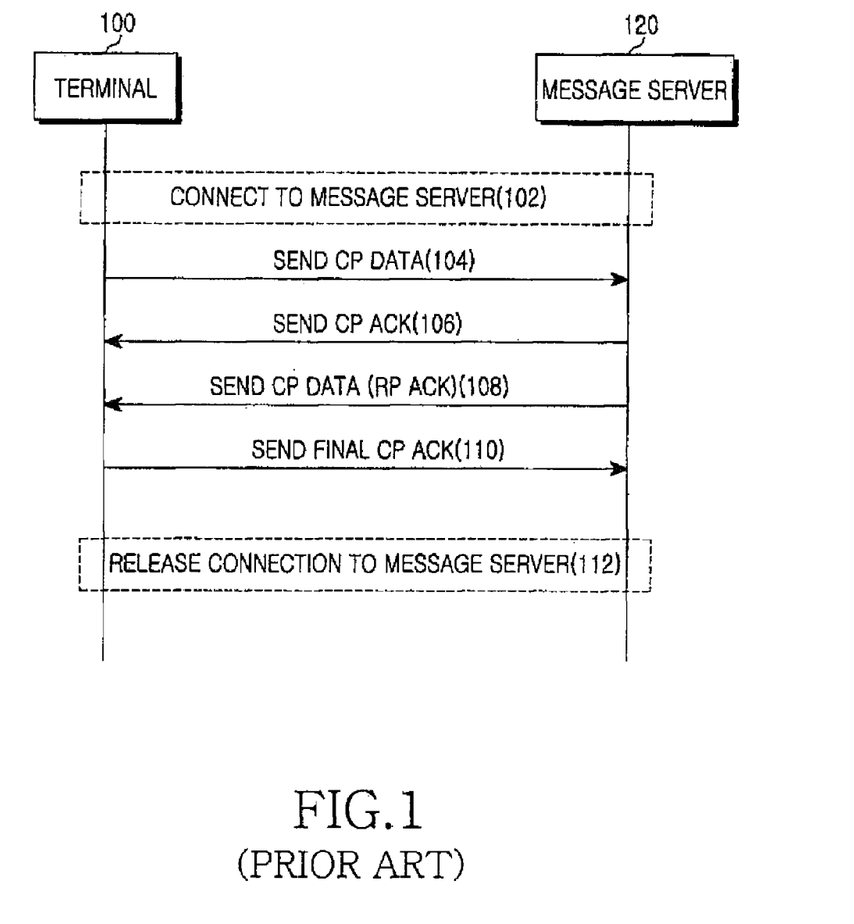
FIG. 1 illustrates a short message transmission in a general mobile communication system.

FIG. 1 illustrates a short message transmission in a general mobile communication system.

The mobile communication system of FIG. 1 includes a portable terminal 100 and a message server 120.

The portable terminal 100 sends a short message within an allowed number of characters limited by a communication provider. The portable terminal 100 performs a signal connection setup with the message server 120 in step 102, processes the corresponding text message in accordance with a wireless protocol, and then sends control protocol (CP) data to the message server 120 in step 104.

Upon receiving the data, the message server 120 sends ACK (acknowledgement) messages to the portable terminal 100 in response to the message in steps 106 and 108. Thus, the portable terminal 100 can check whether the message is transmitted successfully, or whether error occurs in the transmission. In the case of a failed message transmission, the portable terminal 100 retransmits the failed short message and then sends a final ACK to the message server 120 in step 110, releases the signal connection to the message server 120 in step 112, and finishes the short message transmission.

Figure 2:
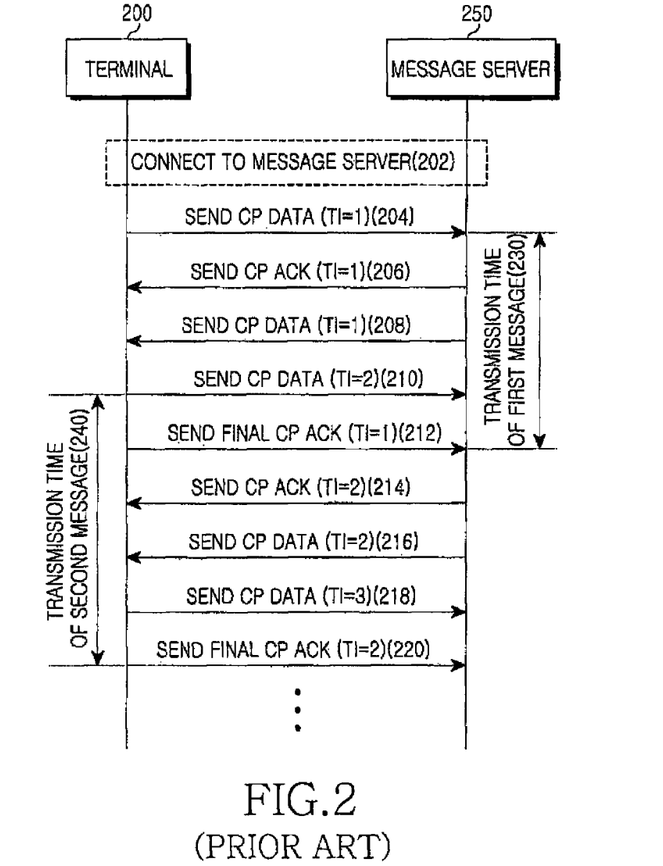
FIG. 2 illustrates a multi-message transmission in a general mobile communication system.

FIG. 2 illustrates a multi-message transmission in a general mobile communication system.

The mobile communication system of FIG. 2 can include a portable terminal 200 and a message server 250. The multi-message is greater than the short message in the data size and includes a concatenated SMS which sends the same or similar short messages with different number of words or characters.

The portable terminal 200 performs the signal connection setup with the message server 250 in step 202 as in the short message transmission, and sends the first short message to the message server 250 in step 204. Receiving the message, the message server 250 sends response messages of the received messages to the portable terminal 220 in steps 206 and 208. Upon receiving the response messages, the portable terminal 200 sends the second SMS message in step 210 and then sends a final ACK to the message server 250 in response to the ACK message of the first short message in step 212.

As sending the last short message in the same manner, the portable terminal 200 sends the final ACK to the message server 250 and releases the signal connection to the message server 250. The transmission time 230 of the first message is measured from the transmission of the first message from the portable terminal 200 to the transmission of the final ACK for the message to the message server 250.

As discussed above, when the multi-message is transmitted using the signal connection setup once established in the mobile communication system, the time corresponding to the signal connection delay time and the radio resources are saved. However, since the plurality of the short messages to transmit are delivered each in the manner of the short message transmission, the transmission of the total short messages takes a considerable time and the radio resources are occupied simultaneously during a quite long time.

SUMMARY OF THE INVENTION

An aspect of the present invention is to address at least the above mentioned problems and/or disadvantages and to provide at least the advantages described below. Accordingly, an aspect of the present invention is to provide an apparatus and a method for transmitting a message to enhance efficiency of radio resources in a mobile communication system.

Another aspect of the present invention is to provide an apparatus and a method for reducing a message transmission time in a mobile communication system.

The above aspects are achieved by providing a portable terminal for transmitting a message. The portable terminal includes a controller for transmitting consecutive message data to a message server and controlling the sending of a message informing or indicating reception of response messages to the message server after receiving the response messages in reply to the transmitted message data.

According to one aspect of the present invention, a message server for transmitting a message includes a server controller for consecutively receiving message data from a portable terminal, sending response messages of the message data to the portable terminal, and releasing a connection to the portable terminal when receiving a message informing of reception of the response messages from the portable terminal.

According to another aspect of the present invention, a method for transmitting a message in a portable terminal includes transmitting consecutive message data to a message server; receiving response messages in reply to the transmitted message data; sending a message informing of the reception of the response messages to the message server; and releasing a connection to the message server after sending the message informing of the reception of the response messages.

According to yet another aspect of the present invention, a method for transmitting a message in a message server includes receiving at least one message data from a portable terminal and sending a response message to the portable terminal in reply to the message data; and releasing a connection to the portable terminal when receiving a message informing of a reception of the response messages from the portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

DETAILED DESCRIPTION OF THE INVENTION

The following description with reference to the accompanying drawings is provided to assist in a comprehensive understanding of exemplary embodiments of the present invention as defined by the claims and their equivalents. The description includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention, as described herein, provide an apparatus and a method for addressing inefficiency of radio resources in processing response messages of a multi-message transmitted in a mobile communication system. The multi-message is larger in data size than a short message and includes a message which is transmitted via concatenated SMS which sends the same or similar short messages to different identification numbers.

Figure 3:
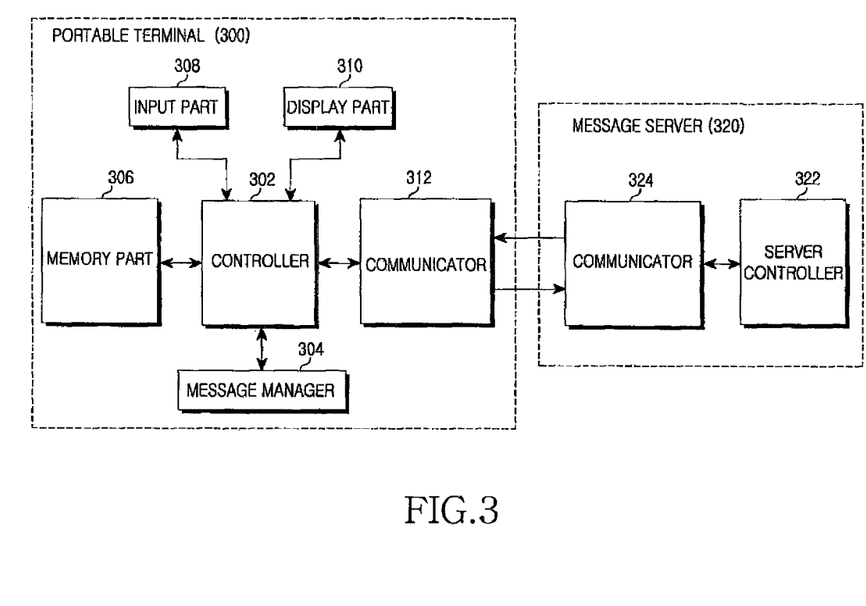
FIG. 3 illustrates a mobile communication system according to an exemplary embodiment of the present invention.

FIG. 3 is a block diagram of a mobile communication system according to an exemplary embodiment of the present invention.

The mobile communication system of FIG. 3 can include a portable terminal 300 and a message server 320. The portable terminal 300 can includes a controller 302, a message manager 304, a memory part 306, an input part 308, a display part 310, and a communicator 312.

The controller 302 of the portable terminal 300 controls operations of the portable terminal 300. For example, the controller 302 processes and controls voice communications and data communications. In addition to the typical functions of the portable terminal, the controller 302 controls the message manager 304 to generate a message that includes information indicative of the multi-message (e.g., sequence number, start bit and end bit) in the multi-message transmission, and controls the sending of the message generated by the message manager 304 to the message server 320.

The controller 302 of the portable terminal 300 sends data of the message to the message server 320. When receiving a response message (ACK) from the message server 320, the controller 302 sends a reply message (final ACK) of the received response message to the message server 320. After sending all the reply messages (final ACK) of the message data, the controller 302 releases the signal connection to the messages server 320.

The message manager 304 generates the message including the multi-message information indicative of the multi-message under the control of the controller 302.

The memory part 306 includes a Read Only Memory (ROM), a Random Access Memory (RAM), and a flash ROM. The ROM contains microcodes and reference data of programs for the processing and the controlling of the controller 302 and the message manager 304.

The RAM, which is a working memory of the controller 302, stores temporary data generated during program executions. The flash ROM contains updatable storing data such as a phone book, outgoing messages, and incoming messages.

The input part 308 includes a plurality of function keys such as number buttons (0-9) a menu button, a cancel (delete) button, an OK button, a TALK button, an END button, an Internet access button, navigation buttons (direction keys), and character input keys. The input part 308 provides key input data (e.g., request for the message generation) corresponding to a key pressed by a user to the controller 302.

The display part 310 displays state information during the operation of the portable terminal 300. The display 310 may process one or more of a limited number of characters, videos, and still images. The display part 310 can employ a color Liquid Crystal Display (LCD) or a plurality b of Light Emitting Diode (LED).

The communicator 312 transmits, receives, and processes a radio signal of data input and output via an antenna (not shown). For example, in transmission, the communicator 312 channel-encodes the data to spread over a greater bandwidth (i.e., CDMA), RF-processes and transmits the spread-spectrum or CDMA data. In the reception, the communicator 312 converts the received RF signal to a baseband signal and restores the data by dispreading and channel-decoding the baseband signal. In this embodiment, the communicator 312 connects to the message server 320 and transmits the generated message to the message server 320.

While the controller 302 of the portable terminal 300 can function as the message manager 304, these functions are separately described herein to ease the understanding, the scope of the present invention. One skilled in the art can understand various changes and modifications of the embodiments described herein without departing from or limiting the scope and spirit of the invention. For example, the controller 302 may process the functions of the message manager 304.

The message server 320 can include a server controller 322 and a communicator 324. The server controller 322 controls operations of the message server 320. For example, when receiving a message transmission request from an originating portable terminal 300 and confirming that the requested message is a multi-message, the server controller 322 sends a response message (ACK) of the message received from the portable terminal 300. The server controller 322, confirming the multi-message transmission request, can send the response message for every message received from the portable terminal 300 as described above, or receive messages from the portable terminal 300 over a certain time and then send one response message.

The communicator 322 of the message server 320 communicates with the portable terminal 300 and receives the single message or the multi-message from the portable terminal 300.

So far, the mobile communication system for the multi-message transmission has been described. Now, a method for transmitting the multi-message in the mobile communication system is explained.

Figure 4:
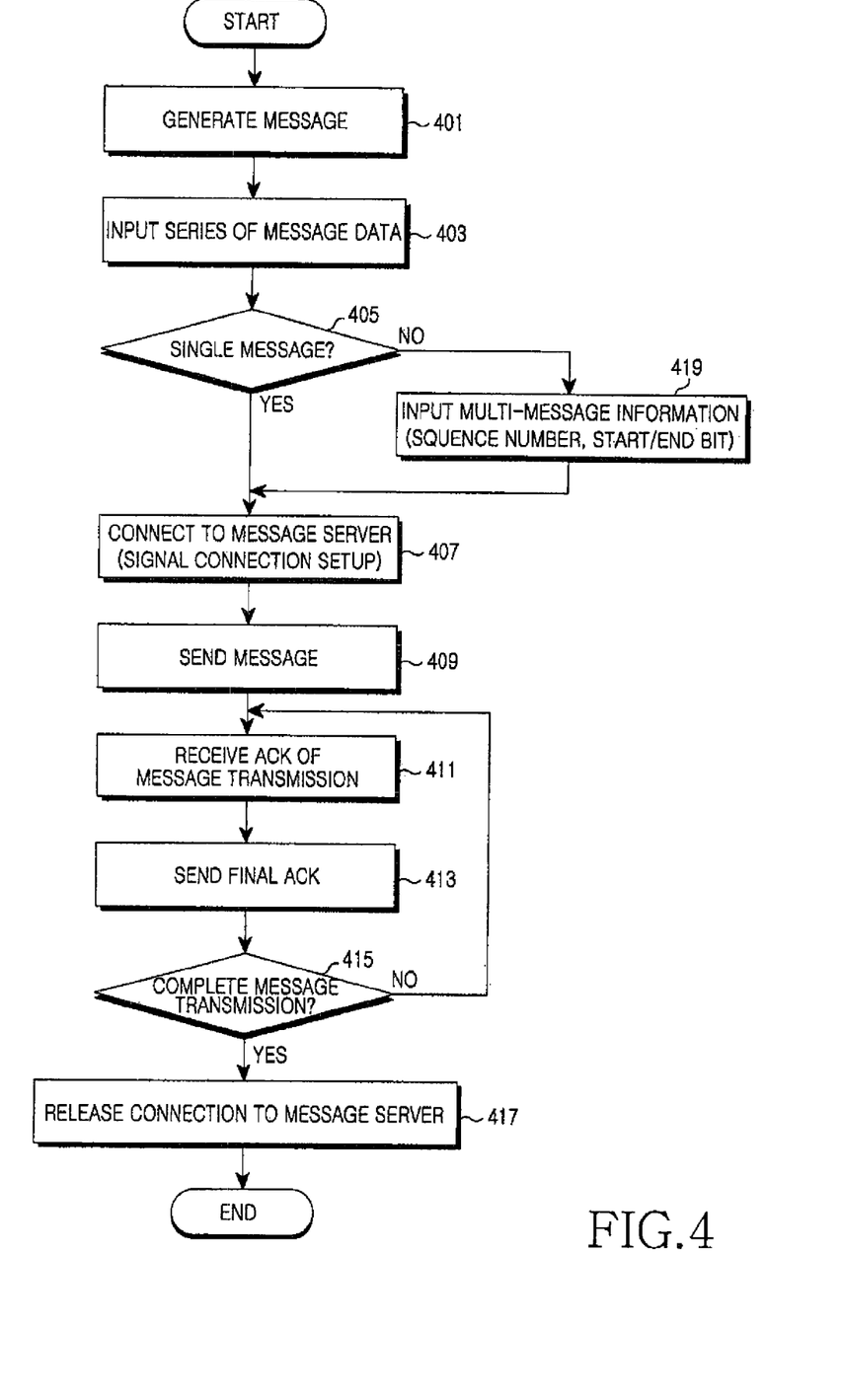
FIG. 4 illustrates a method for transmitting a multi-message from a portable terminal according to an exemplary embodiment of the present invention.

FIG. 4 is a flowchart illustrating a method of the portable terminal for transmitting a multi-message according to an exemplary embodiment of the present invention.

In step 401, the controller 302 of the portable terminal 300 generates a message. Herein, the generated message indicates the message to be transmitted by the portable terminal 300.

The controller 302 receives a series of message data from the user of the portable terminal 300 in step 403, and checks the type of the message to be generated in step 405. In step 405, the controller 302 checks whether the message is a single message, a multiple-SMS based on the transmission length, or a multi-message such as a concatenated SMS.

When the message is a multi-message, the controller 302 receives multi-message information indicative of the multi-message from the user of the portable terminal 300 in step 419. The multi-message information can include a sequence number indicative of the order of the messages, and a start bit and an end bit indicative of the start and the end of the multi-message.

When the message is a single message, the controller 302 performs the signal connection setup with the message server 320 in step 407 and transmits the message data to be generated to the message server 320 in step 409.

Next, the controller 302 receives a response message of the message data from the message server 320 in step 411 and sends a response/reply message to the message server 320 informing the message server 320 of the reception of the response message in step 413.

The controller 302 can send one response/reply message (full ACK) to the message server 320, or send response/reply messages corresponding each of the response messages received from the message server 320 respectively. This process will be illustrated in FIGS. 6 and 7.

In step 415, the controller 302 determines whether all the response/reply messages to send are transmitted or not, by checking a Transfer Identifier (TI) of the response message received from the message server 320.

Not confirming the completion of the response/reply message transmission, the controller 302 goes back to step 411.

Confirming the completion of the response/reply message transmission, the controller 302 releases the signal connection to the message server 320 in step 417 and then finishes this process.

Figure 5:
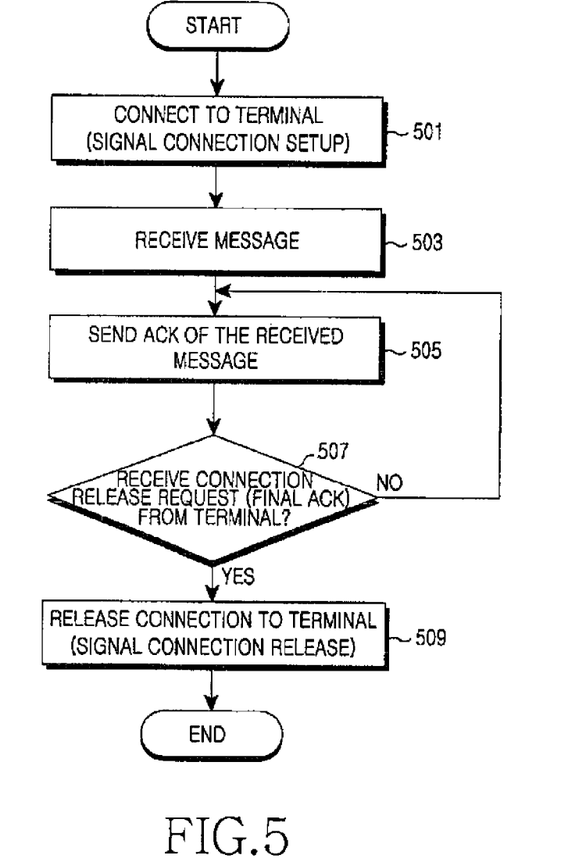
FIG. 5 illustrates a method for transmitting a multi-message from a message server according to an exemplary embodiment of the present invention.

FIG. 5 is a flowchart illustrating a method of the message server for transmitting a multi-message according to an exemplary embodiment of the present invention.

The server controller 322 of the message server 320 sets the signal connection to the portable terminal 300 in step 501 and receives the message data from the portable terminal 300 in step 503.

In step 505, the server controller 322 sends a response message of the received message data to the portable terminal 300.

The server controller 322 sends the response message for each message data received by way of example. In other aspects of the invention, after receiving every message data from the portable terminal 300, the server controller 322 may send one response message; that is, a full ACK, informing or indicating the reception of every message data, which will be described in FIGS. 6 and 7.

In step 507, the server controller 322 checks whether the connection release request is received from the portable terminal 300. In the case of not receiving the request, the server controller 322 returns to step 505.

Upon receiving the request, the server controller 322 releases the signal connection to the portable terminal 300 in step 509 and then finishes this process.

Figure 6:
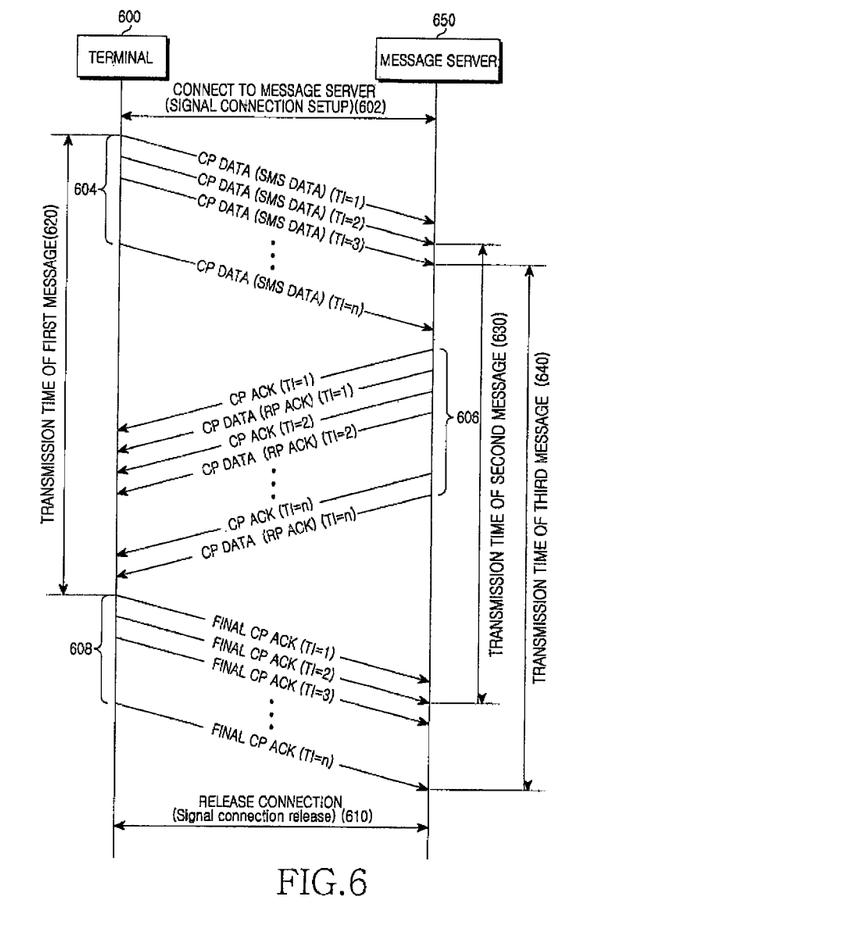
FIG. 6 illustrates a message transmission in the mobile communication system according to an exemplary embodiment of the present invention.

FIG. 6 illustrates a message transmission in a mobile communication system according to an exemplary embodiment of the present invention.

The mobile communication system of FIG. 6 can include a portable terminal 600 and a message server 650. The multi-message is larger in data size than the short text message and includes a concatenated SMS which sends the same or similar short messages with different numbers of characters.

The portable terminal 600 establishes the signal connection with the message server 650 in step 602 and transmits messages in order starting from the first message to the message server 650 in step 604. Receiving the messages, the message server 650 sends response messages of the messages to the portable terminal 600 in step 606. The portable terminal 600, receiving the response messages, and sends the final ACK in response to each response message to the message server 650 in step 608.

More specifically, to send N-ary multiple messages, the portable terminal 600 transmits the first to N-th messages to the message server 650. Upon receiving the messages, the message server 650 sends response messages of the received messages to the portable terminal 600.

Next, the portable terminal 600 sends the final ACK informing or indicating the reception of the response messages to the message server 650 and then releases the signal connection to the message server 650 in step 610.

In the message transmission as above, the transmission time 620 of the first message is measured from the transmission of the first message from the portable terminal 600 to the transmission of the final ACK in reply to the response message received from the message server 650. This also applies to the transmission time 630 of the second message and the transmission time 640 of the third message.

Figure 7:
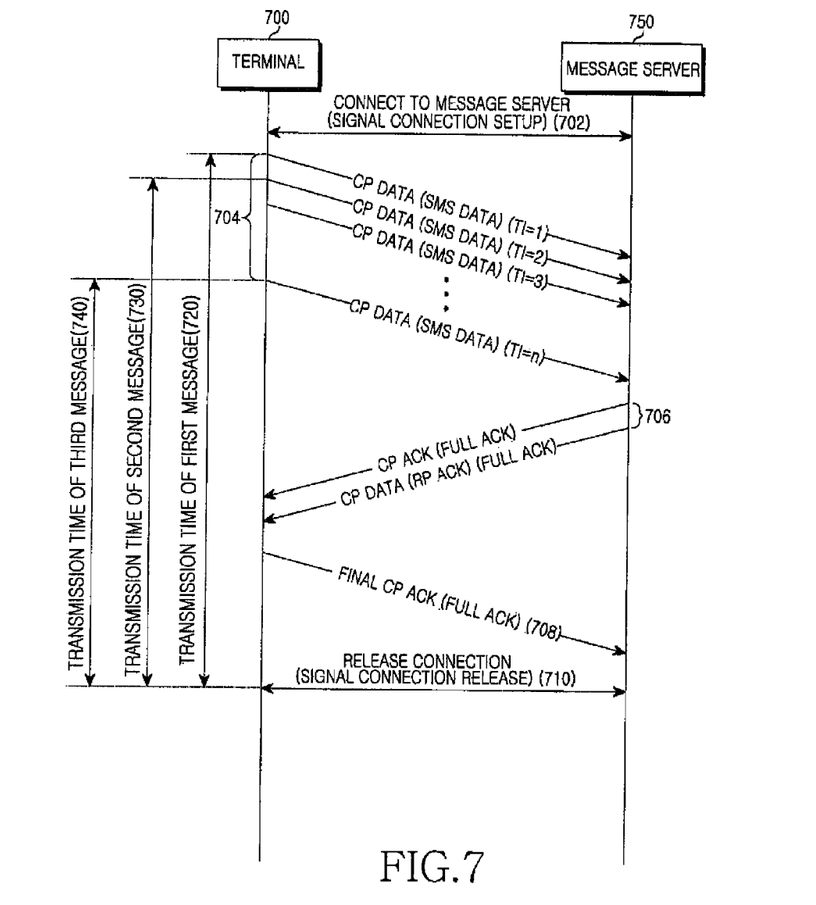
FIG. 7 illustrates a message transmission in a mobile communication system according to another exemplary embodiment of the present invention. Throughout the drawings, like reference numerals will be understood to refer to like parts, components and structures.

FIG. 7 illustrates a message transmission in a mobile communication system according to another exemplary embodiment of the present invention. In FIG. 7, responses for the message to be sent by the portable terminal are transmitted as one response message according to another exemplary embodiment of the present invention.

The mobile communication system of FIG. 7 can include a portable terminal 700 and a message server 750. The multi-message is greater in the data size than the short text message and includes a concatenated SMS which sends the same or similar short messages with different numbers.

The portable terminal 700 sets the signal connection with the message server 750 in step 702 and transmits messages in order starting from the first message to the message server 750 in step 704. After receiving the messages over a certain time, the message server 750 sends one response message (full ACK) to the portable terminal informing the portable terminal 700 of the reception of every message in step 706. Upon receiving the response message, the portable terminal 700 sends one response/reply message informing of the reception of the response message to the message server 750 in step 708.

More specifically, to send N-ary multiple messages, the portable terminal 700 transmits the first to N-th messages to the message server 750. Herein, the message includes the multi-message information indicative of the multi-message.

After receiving all the messages from the portable terminal 700, the message server 750 sends one response message of the received messages to the portable terminal 700. Herein, the message server 750 can determine whether every message is received from the portable terminal 700, by checking the multi-message information (e.g., start bit and end bit) in the message.

Next, the portable terminal 700, receiving the one response message, sends one response message informing of the reception of the response message to the message server 750 and then releases the signal connection to the message server 750 in step 710. In the above message transmission, the transmission time 720 of the first message is measured from the transmission of the first message from the portable terminal 700 to the signal connection release with the message server 750. This also applies to the transmission time 730 of the second message and the transmission time 740 of the third message. As set forth above, the data of the multi-message to be sent by the portable terminal is transmitted in one lump and then the response messages (ACK) are received. Therefore, it is possible to address the inefficiency of the radio resources when the response message (ACK) is received in every message data transmission in the conventional multi-message transmission. Also, the message transfer rate can be enhanced.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof it will be understood by those skilled in the art that various changes in form and details may be made therein without departing from the spirit and scope of the invention as defined by the appended claims and their equivalents.

What is claimed is:

1. A portable terminal for transmitting a message, the portable terminal comprising:
   a controller for:
   transmitting a multi-message configured as a concatenated sequence of message data to a message server, each of said message data including a sequence number indicative of an order of the message data and a start bit and an end bit indicative of a start and an end of multi-message message data;
   receiving a response message in response to the transmitted message data from the message server after all of the message data has been transmitted; and
   controlling the sending of a final message to the message server informing the message server of reception of response message in reply to the transmitted message data after receiving the response message corresponding to the message data indicating the end of multi-message message data,
   wherein the controller, after sending the message data indicating the end of multi-message message data, receives from the message server one of: a message in reply to each of the message data and one integrated reply.

2. The portable terminal of claim 1, wherein the controller:
   releasing a connection to the message server after sending the final message.

3. The portable terminal of claim 2, wherein the controller determines whether the at least one reply message is transmitted or not by checking Transfer Identifier (TI) of the response message received from the message server.

4. A message server for transmitting a message, the message server comprising:
   a server controller for:
   receiving a multi-message configured as a concatenated sequence of from a portable terminal, each message data comprises at least one of a sequence number indicative of an order of the message data, and a start bit and an end bit indicative of a start and an end of the multi-message,
   determining an end of the received all of the message data comprising the multi-message by checking for a presence of the end bit in each received message data;
   sending response messages in response to the received message data to the portable terminal after all of the message data has been received, and
   releasing a connection to the portable terminal after receiving a message indicating reception of the response messages from the portable terminal,
   wherein the response messages comprise one of: a response to each of the message data, and one integrated response message.

5. A method for transmitting a message in a portable terminal, the method comprising:
   transmitting a multi-message configured as a concatenated sequence of message data to a message server, wherein the message data comprises multi-message information comprising at least one of a sequence number indicative of an order of the message data, and a start bit and an end bit indicative of a start and an end of the multi-message;
   receiving a response messages in reply to the transmitted message data from the message server after all message data has been transmitted;
   sending a message informing of the reception of the response messages to the message server; and
   releasing a connection to the message server after sending the message informing of the reception of the response messages,
   wherein the receiving of the response messages comprises one of: consecutively receiving the response messages corresponding to each of the message data from the message server, or receiving one integrated response message from the message server.

6. The method of claim 5, wherein the connection to the message server is released after all the response/reply messages of the message data to be transmitted are sent.

7. The method of claim 6, wherein whether the response/reply messages of the message data to be sent are transmitted or not is determined by checking a Transfer Identifier (TI) of the response message received from the message server.

8. A method for processing a message in a message server, the method comprising:

receiving a multi-message configured as a concatenated sequence of from a portable terminal, each message data comprises at least one of a sequence number indicative of an order of the message data, and a start bit and an end bit indicative of a start and an end of the multi-message;

determining an end of the received all of the message data based on a status of the end bit;

sending a response message to the portable terminal after all of the message data has been received; and releasing a connection to the portable terminal when receiving a message indicating a reception of the at least one response messages from the portable terminal, wherein the sending of the response messages to the portable terminal comprises one of: sending response messages for each of the message data, and sending one integrated response message.

9. A method for communicating between a portable terminal and a message server comprising the steps of:

sending, by the portable terminal, a multi-message comprising a concatenated sequence of message data to the message server wherein the message data comprises multi-message information comprising a sequence number indicative of an order of the message data, and a start bit and an end bit indicative of a start and an end of the multi-message;

sending, by the message server, a response message to the portable terminal after all of the message data has been received;

receiving, by the portable terminal, at least one response message from the message server after all message data has been transmitted;

recording, by the portable terminal, reception of each of said received at least one response message; and transmitting, by the portable terminal, an acknowledgement message for each of said recorded received messages after all of the recorded received messages are received.

wherein the at least one response messages comprise one of: a response to each of the message data and one integrated response message.

\* \* \* \* \*

UNITED STATES PATENT AND TRADEMARK OFFICE
CERTIFICATE OF CORRECTION

PATENT NO. : 8,543,142 B2  
APPLICATION NO. : 12/212095  
DATED : September 24, 2013  
INVENTOR(S) : Il-Kwon Yun et al.

It is certified that error appears in the above-identified patent and that said Letters Patent is hereby corrected as shown below:

In the Claims

Column 8, Claim 4, Line 31 should read as follows:  
--...sequence from a portable terminal,...--

Column 8, Claim 5, Line 56 should read as follows:  
--...receiving a response message in reply...--

Column 9, Claim 8, Line 13 should read as follows:  
--...sequence from a portable terminal,...--

Signed and Sealed this  
Nineteenth Day of November, 2013

Teresa Stanek Rea  
*Deputy Director of the United States Patent and Trademark Office*